United States Patent Office 3,798,228
Patented Mar. 19, 1974

3,798,228
METHOD FOR THE PREPARATION OF
DIFLUOROPYRIDINES
Max M. Boudakian, Pittsford, and Stanley J. Chiras,
Hilton, N.Y., assignors to Olin Corporation
No Drawing. Filed Apr. 13, 1970, Ser. No. 28,025
Int. Cl. C07d 31/26
U.S. Cl. 260—290 HL                    6 Claims

ABSTRACT OF THE DISCLOSURE

This invention relates to the preparation of difluoropyridines and substituted difluoropyridines by the simultaneous replacement of two amino groups by diazotization of selected diaminopyridines in hydrogen fluoride.

---

This invention relates to the direct method of preparing difluoropyridines and substituted difluoropyridines by the simultaneous replacement of two amino groups by diazotization of selected diaminopyridines in hydrogen fluoride.

Difluoropyridines generally have high thermal stability and are useful agricultural chemicals particularly as preemergence herbicides where they are effective in controlling a variety of noxious weeds.

Previously known methods for preparing difluoropyridines include a four-step conversion from methyl-6-fluoropicolinate to 2,6-difluoropyridine in low yield [G. C. Finger et al., Nature, 595, (1961)]. Other known methods include fluorination of dichloropyridines using a polar solvent such as potassium fluoride [G. C. Finger et al., J. Org. Chem., 89, 1666 (1963)], or in a solvent-free medium [M. M. Boudakian, J. Heterocyclic Chem., 5, 683 (1968)]. Generally in using the polar solvent method, the solvent is expensive and furthermore, the process requires a tedious solvent recovery and recycle system. In the solvent-free route, autoclaves are required for handling high temperatures and pressures. Consequently, all the above methods are not considered economically attractive.

Now, it has been found that the above-described disadvantages are obviated by the method of this invention wherein the difluoropyridines and selected substituted derivatives thereof can be conveniently and economically provided from selected diaminopyridines by simultaneous replacement of the two amino groups by diazotization of said diaminopyridines with sodium nitrite in hydrogen fluoride and then decomposing with heat to remove nitrogen as shown by the following equation wherein, for example 2,6-diaminopyridine is the starting material:

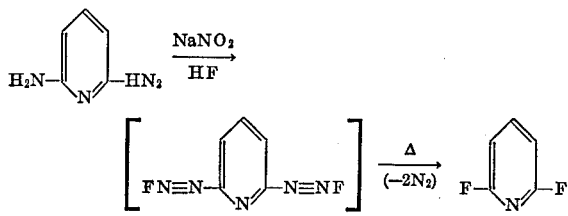

The method of this invention wherein difluoropyridines are prepared from select diaminopyridines by the simultaneous replacement of two amino groups by diazotization in hydrogen fluoride is particularly surprising and unexpected because attempts to convert o-, m- or p-phenylenediamine through diazotization-fluorination in hydrogen fluoride to the respective o-, m- or p-difluorobenzene have proven unsuccessful. Additionally, while a few examples of the classical two-step Schiemann route to difluoroaromatics have been published, heterocyclics such as diaminopyridine have resisted transformation to the corresponding difluoropyridine (A. Roe, Organic Reactions, vol. V, J. Wiley, N.Y., 1949, pp. 193–228).

The starting materials for this invention include any diaminoazaheterocyclic compounds and more particularly diaminopyridines and substituted diaminopyridines having the formula:

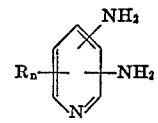

wherein each R is independently selected from the following groups: alkyl and more particularly, lower alkyl of 1 to 4 carbon atoms, e.g. methyl, propyl and butyl; nitro; alkoxy and more particularly alkoxy having 1 to 4 carbon atoms, e.g. methoxy, ethoxy and butoxy; and halogens e.g. bromine, fluorine, chlorine and iodine; and $n$ is an integer of 0 to 3.

Illustrative of such starting materials are the following: 2,6-diaminopyridine, 3,5-diaminopyridine, 2,4-diaminopyridine, 2,5-diaminopyridine, 2,3-diaminopyrdine, 3,4-diaminopyridine, 4-methyl-2,3-diaminopyridine, 5-bromo-2,3-diaminopyridine, 3-nitro-2,4-diaminopyridine, 6-methyl-2,5-diaminopyridine, 3-bromo-2,6-diaminopyridine, 4-methyl-2,6-diaminopyridine, 3-nitro-2,6-diaminopyridine, 3-methoxy-2,6-diaminopyridine, 6-chloro-3,4-diaminopyridine, 6-methyl-3,4-diaminopyridine, and 2-bromo-3,5-diaminopyridine. Further illustrations of compounds having the above designated formula are disclosed in "The Chemistry of Heterocyclic Compounds," Edited by Arnold Weissberger, Part 3, Charpter IX, Aminopyridines, Andrew S. Tomcufcik and Lee N. Starker, 1962, Interscience Publishers, N.Y.

In carrying out the method of this invention, generally a molar ratio of hydrogen fluoride to the selected diaminopyridine of from about 3:1 to about 30:1 may be used with the preferred range being 7.5:1 to 25:1. The amount of sodium nitrite utilized will generally be a molar ratio of sodium nitrite to selected diaminopyridine of from about 2:1 to about 3:1 with the preferred range being 2.1:1 to 2.3:1.

The hydrogen fluoride which is used in the diazotization of the diaminopyridines may generally vary from about 70% aqueous up to anhydrous hydrogen fluoride and preferably is anhydrous.

The diazotization temperature may vary from about −20° C. to about 25° C. and preferably from −10° C. to 10° C. and the reaction may generally be carried out under varying pressure conditions and more particularly at pressures from about 0.5 to about 50 atm. with the preferred pressure range being 0.8 to 1.5 atm. The decomposition temperature will generally vary from about 15 to about 100° C. and preferably from 30 to 75° C.

The overall reaction time, including decomposition, will vary widely depending on the particular conditions. More particularly, the reaction time generally will vary from about 2 to about 25 hours and preferably from 7.5 to 20 hours.

The following example will further illustrate the method of this invention.

EXAMPLE

To a one liter stainless steel reactor cooled at −10° C. is charged anhydrous hydrogen fluoride (400 g.; 20 moles). Then 2,6-diaminopyridine (109.1 g.; 1.0 mole) is added during a 20-minute period, followed by the addition of sodium nitrite (155.3 g.; 2.2 moles) at 0°±5° C. during a 45-minute period, to form a reaction mixture which contains 2,6-pyridyl bis(diazonium fluoride). This reaction mixture is then decomposed by heating at 40–70° C. during a 14-hour period. During the decomposition, nitrogen saturated with hydrogen fluoride is vented through refrigerated condensers and the hydrogen fluoride refluxes back to the reaction vessel.

After the decomposition is complete (no gas evolution), the reaction mixture is cooled to 0° C. and transferred to a neutralization vessel containing ammonium hydroxide (29%) to neutralize the hydrogen fluoride. 2,6-difluoropyridine is then recovered from the basic mixture by steam distillation to give 71.4 grams (0.621 mole; 62.1% yield) of a colorless liquid which assayed 99.4% by vapor phase chromatograpyhy (10% Carbowax 20M column). The product was B.P. 125° C., $n_D^{24}$ 1.4362.

What is claimed is:

1. A method of preparing difluoropyridine and substituted difluoropyridine which comprises:
  (a) diazotizing a diaminopyridine compound of the formula:

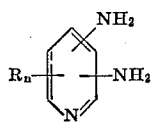

wherein each R is independently selected from the group consisting of alkyl of 1 to 4 carbon atoms; nitro; alkoxy of 1 to 4 carbon atoms; and halogen and $n$ is an integer of 0 to 3; in the presence of hydrogen fluoride and sodium nitrite at a temperature of from about −20° C. to about 25° C. to form a reaction mixture containing the pyridyl bis-(diazonium fluoride) salt of the diaminopyridine compound and
  (b) then heating said reaction mixture at a temperature of from about 15° C. to about 100° C. to decompose said pyridyl bis(diazonium fluoride) salt to the corresponding difluoropyridine.

2. The method of claim 1 wherein molar ratios of about 3:1 to about 30:1 of said hydrogen fluoride to said diaminopyridine compound and about 2:1 to about 3:1 of said sodium nitrite to said diaminopyridine compound are used.

3. The method of claim 1 wherein said diazotization is carried out at about −10 to about 10° C. and at about 0.5 to about 50 atmospheres and said decomposition is carried out at about 30 to about 75° C.

4. The method of claim 1 wherein said diaminopyridine compound is 2,6-diaminopyridine.

5. The method of claim 4 wherein molar ratios of about 3:1 to about 30:1 of said hydrogen fluoride to said diaminopyridine compound and about 2:1 to about 3:1 of said sodium nitrite to said diaminopyridine compound are used.

6. The method of claim 4 wherein said diazotization is carried out at about −10 to about 10° C. and at about 0.5 to about 50 atmospheres and said decomposition is carried out at about 30 to about 75° C.

References Cited
UNITED STATES PATENTS
2,563,796   8/1951   Shenk et al. _____ 260—290

FOREIGN PATENTS
600,706   1934   Germany _____ 260—290

OTHER REFERENCES
Tschitschibabin et al.: J. Chem. Soc., vol. 110, part I, pp. 224-25 (1916).

HARRY I. MOATZ, Primary Examiner

U.S. Cl. X.R.
260—141